United States Patent [19]
Spatafora

[11] Patent Number: 5,887,701
[45] Date of Patent: Mar. 30, 1999

[54] METHOD AND UNIT FOR FORMING AND CONVEYING GROUPS OF PRODUCTS

[75] Inventor: Mario Spatafora, Bologna, Italy

[73] Assignee: Azionaria Costruzioni Macchine Automatiche A.C.M.A. S.p.A., Bologna, Italy

[21] Appl. No.: 852,391

[22] Filed: May 7, 1997

[30] Foreign Application Priority Data

May 8, 1996 [IT] Italy .............................. BO96A0256 U

[51] Int. Cl.[6] .................................................. B65G 47/26
[52] U.S. Cl. ....................................... 198/431; 198/484.1
[58] Field of Search ............................... 198/347.1, 431, 198/426, 427, 624, 457.04, 457.05, 803.13, 484.1, 803.1; 414/790.3, 795.1, 790.4

[56] References Cited

U.S. PATENT DOCUMENTS

| | | |
|---|---|---|
| 4,314,785 | 2/1982 | LaFleur, Jr. et al. . |
| 4,502,587 | 3/1985 | Clark ..................................... 198/347.1 |
| 5,579,894 | 12/1996 | Glazier et al. ........................... 198/431 |

FOREIGN PATENT DOCUMENTS

| | | |
|---|---|---|
| 0396995A | 11/1990 | European Pat. Off. . |
| 0403956A | 12/1990 | European Pat. Off. . |
| 1127810 | 4/1962 | Germany . |
| 2320877 | 3/1977 | Germany . |

*Primary Examiner*—Joseph E. Valenza
*Assistant Examiner*—Mark Deuble
*Attorney, Agent, or Firm*—Christenson O'Connor Johnson & Kindness PLLC

[57] ABSTRACT

A method and unit for forming and conveying groups of elongated products, whereby products, fed successively and continuously along a first path, are stacked along a guide by a stacking device to form a group, which is moved along the guide by a lifting device to the input of a second path, and is transferred, along the second path, into a conveying pocket moving along the second path; transfer into the conveying pocket being effected by means of a retaining pocket initially aligned with the guide and moving along the second path.

16 Claims, 3 Drawing Sheets

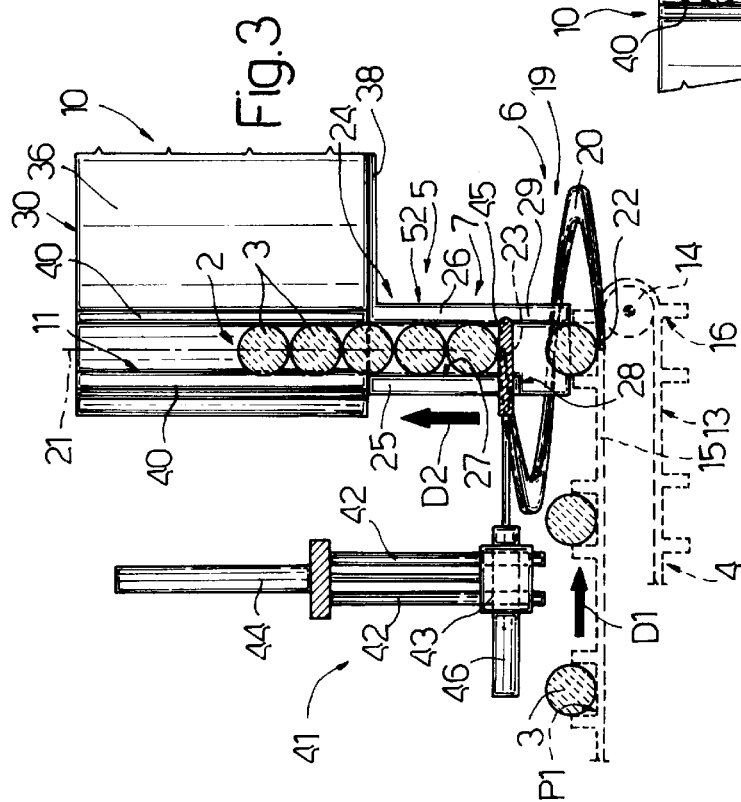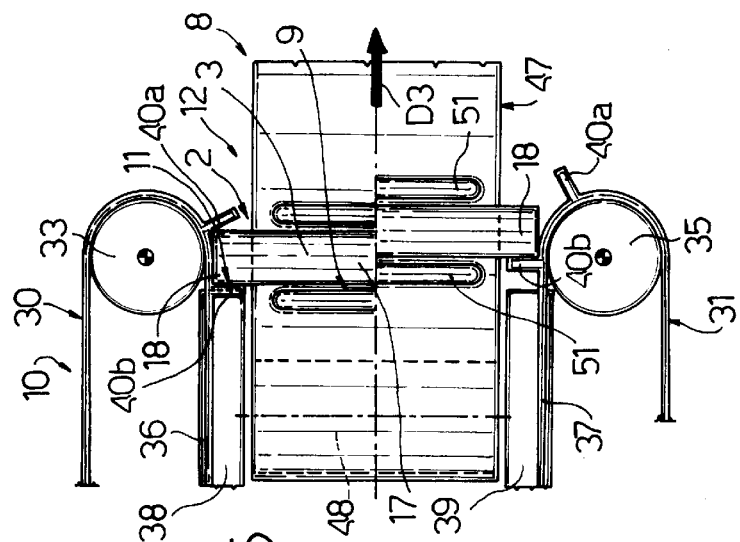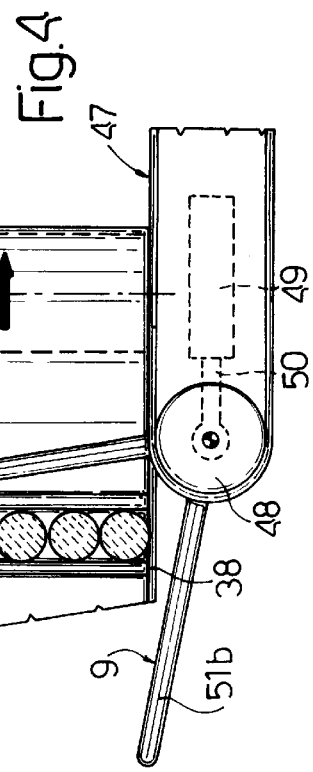

5,887,701

1

METHOD AND UNIT FOR FORMING AND CONVEYING GROUPS OF PRODUCTS

BACKGROUND OF THE INVENTION

The present invention relates to a method of forming and conveying groups of products.

In particular, the present invention relates to a method of forming and conveying groups of elongated products, the method comprising the steps of feeding said products successively and continuously along a first path to a stacking device; stacking the products, by means of the stacking device, along guide elements to form a group, the products in the group being maintained in the stacked position by the guide elements; and transferring the, group along a second path into a respective conveying pocket moving along the second path.

Methods of the above type are normally implemented using stacking devices in which the guide elements, besides maintaining the products in the stacked position as they are being stacked, also provide for feeding each group of stacked products to a conveying device, which comprises a conveying surface extending along the second path, and a conveying element for feeding each group along the conveying surface. The group of products is normally unloaded onto the conveying surface by the guide elements and subsequently engaged and fed along the conveying surface by the conveying element.

Such methods have proved relatively effective in stacking and feeding products with at least one flat contact surface. When working with substantially cylindrical products, on the other hand, unloading the groups onto the conveying surface poses problems, due to each group invariably breaking up as it is unloaded. And the same also applies, at times, to products with a flat contact surface, when the group is subsequently engaged by the conveying element.

SUMMARY OF THE INVENTION

It is an object of the present invention to provide a method of forming and conveying groups of elongated products, and which provides for stacking and conveying elongated products of any shape without incurring the aforementioned drawbacks.

According to the present invention, there is provided a method of forming and conveying groups of elongated products, the method comprising the steps of feeding said products successively and continuously along a first path to a stacking device; stacking said products, by means of said stacking device, along guide means to form a group, said guide means maintaining the products in said group in a stacked position; and transferring said group along a second path into a respective conveying pocket moving along the second path; the method being characterized in that said group is transferred to the conveying pocket by means of a retaining pocket moving in steps along said second path and through a position of alignment with said group on said stacking device.

The present invention also relates to a unit for forming and conveying groups of elongated products.

According to the present invention, there is provided a unit for forming and conveying groups of elongated products, the unit comprising supply means for feeding said products successively and continuously along a first path to a stacking station; a stacking device located at the stacking station, and for stacking said products into a group; guide means located at the stacking station to maintain the prod-

2 ucts in said group in a stacked position; transfer means for transferring said group along a second path; and conveying means having conveying pockets moving along the second path, and each for receiving a respective group; the unit being characterized in that said transfer means comprise at least one retaining pocket moving in steps along said second path and through a position of alignment with said group on said stacking device, and through a transfer station to transfer the group to a respective conveying pocket.

BRIEF DESCRIPTION OF THE DRAWINGS

A non-limiting embodiment of the present invention will be described by way of example with reference to the accompanying drawings, in which:

FIGS. 3, 4 and 5 show, with parts in section and parts removed for clarity, respective details of the FIG. 1 unit.

DETAILED DESCRIPTION OF THE INVENTION

Figure 1:
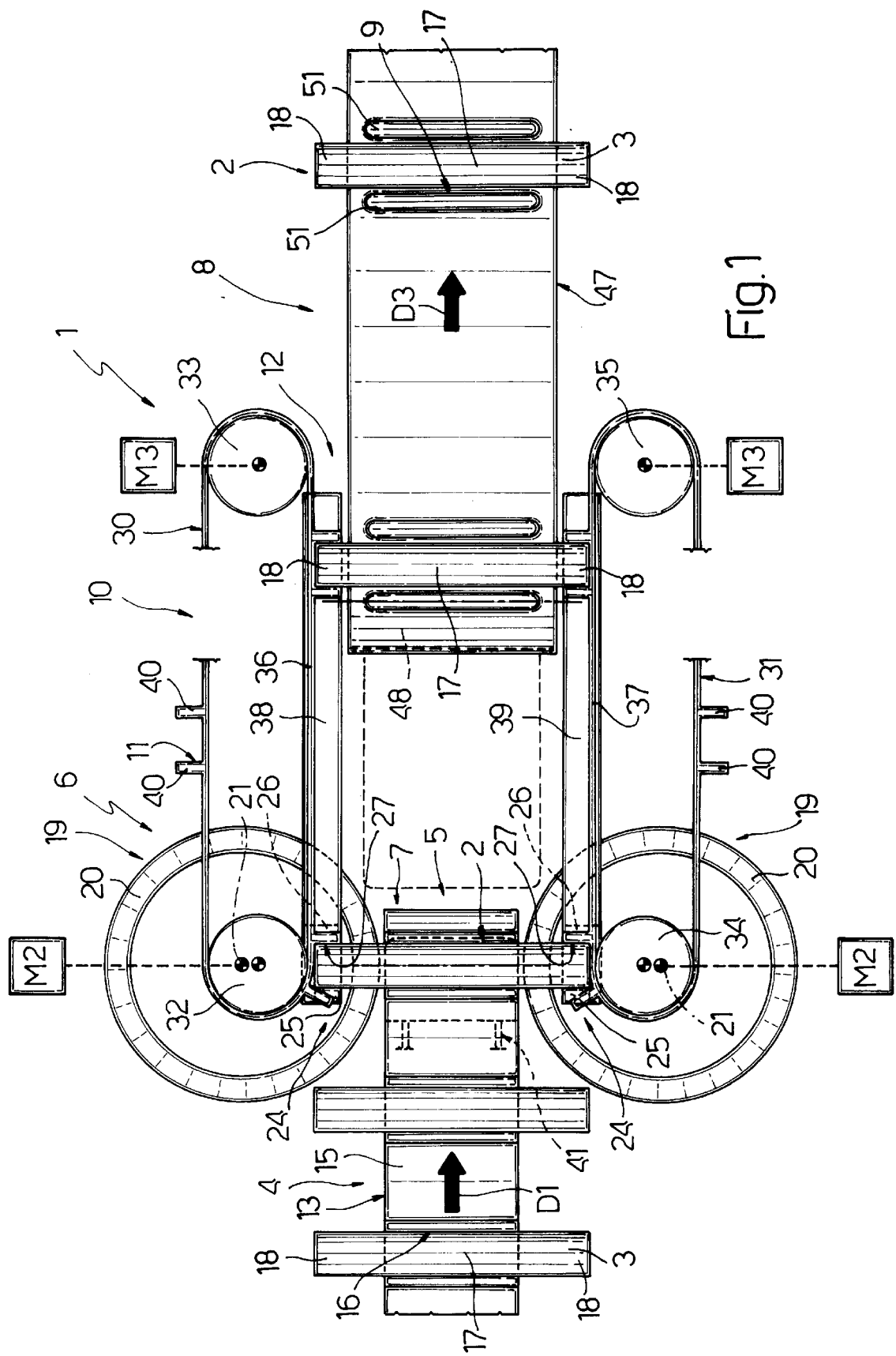
FIG. 1 shows a plan view, with parts removed for clarity, of a unit for forming and conveying groups of elongated products in accordance with the teachings of the present invention.
Figure 2:
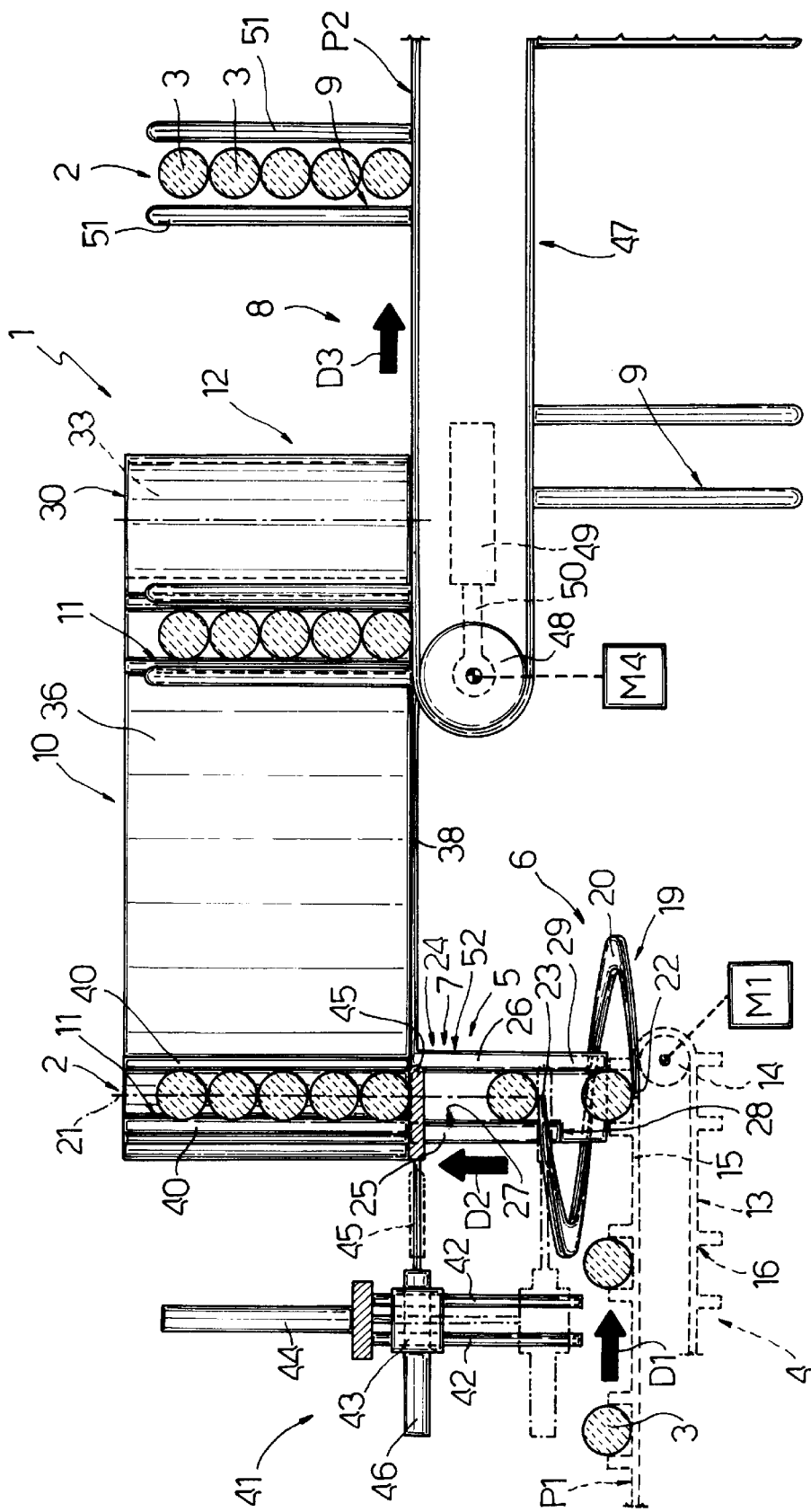
FIG. 2 shows a side view, with parts in section and parts removed for clarity, of the FIG. 1 unit.

Number 1 in FIGS. 1 and 2 indicates a unit for forming and conveying groups 2 of elongated products 3 preferably, but not necessarily, having a substantially circular cross section.

Unit 1 comprises a supply device 4 for feeding products 3 successively and continuously in a traveling direction D1 crosswise to products 3, and along a path P1 extending through a stacking station 5. Unit 1 also comprises a stacking device 6 located at station 5, and for receiving products 3 from device 4, stacking products 3 in a stacking direction D2 substantially crosswise to direction D1, and forming a group 2 of products 3 along a guide 7 extending in direction D2 and for maintaining products 3 in group 2 in a stacked position.

Unit 1 also comprises a conveying device 8, in turn comprising a number of conveying pockets 9 for feeding groups 2 in a direction D3 crosswise to direction D2, and along a further path P2 substantially in series with path P1; and a transfer device 10 located along path P2, between stacking device 6 and conveying device 8, and in turn comprising a number of retaining pockets 11 for receiving groups 2 from stacking device 6 and feeding groups 2 to conveying device 8 via a transfer station 12 located along path P2, between devices 8 and 10, while at the same time maintaining groups 2 in the stacked position.

Device 4 comprises a pocket conveyor belt 13 looped about two pulleys 14 (only one shown), which define on belt 13 a conveying branch 15 extending along path P1; and belt 13 comprises a number of pockets 16 extending crosswise to direction D1, and each for housing a respective product 3 with its central portion 17 inside pocket 16, and its lateral end portions 18 projecting outwards of pocket 16 and branch 15.

Stacking device 6 comprises two screw conveyors 19 located on either side of branch 15, and each having a respective screw 20 rotating continuously about a respective axis 21 parallel to direction D2. Screws 20 are oppositely inclined, and are positioned with their respective bottom ends 22 substantially tangent to branch 15 of belt 13, so as to successively engage lateral end portions 18 of products 3, and feed products 3 in direction D2 by lifting products 3 off branch 15 and by cooperating with guide 7 to stack products 3 on respective top ends 23.

More specifically, guide 7 comprises two substantially C-shaped plates 24 located on either side of branch 15, and each having two vertical walls 25 and 26 located in series with each other in direction D1, and extending in direction D2 to define a respective channel 27 for the passage of a respective lateral end portion 18 of product 3. Each wall 25 has a bottom front opening 28 lower than the top end 23 of respective screw 20 and facing branch 15 of belt 13 so as to be engaged by respective lateral end portion 18 of product 3; and each wall 26 comprises a stop portion 29 facing opening 28 in corresponding wall 25, and which arrests the travel of product 3 in direction D1, and cooperates with respective screw 20 to lead product 3 in direction D2 with respective lateral end portion 18 engaged in sliding manner inside respective channel 27.

Transfer device 10 comprises two conveyor belts 30 and 31 facing each other on either side of path P2, of a width approximately equal to but no less than the height of a group 2, and looped about respective pairs of pulleys 32,33 and 34,35 having respective axes of rotation parallel to direction D2. Pulleys 32 and 34 are located over screws 20, substantially at axes 21; while pulleys 33 and 35 are located on either side of conveying device 8, and define on respective belts 30 and 31, together with respective pulleys 32 and 34, respective forward branches 36 and 37 of belts 30 and 31. Branches 36 and 37 are separated by a distance equal to the length of products 3, and extend over respective guide plates 38 and 39, which are coplanar with each other along path P2, are connected to the top ends of respective walls 26 of plates 24, and support groups 2 housed inside pockets 11 by cooperating with respective lateral end portions 18 of the last product 3 in each group 2.

Each belt 30, 31 comprises a number of pairs of outer projections 40 defining retaining pockets 11, and which are alignable with respective walls 25 and 26 (FIG. 3) so that respective pocket 11 is aligned with channels 27 of guide 7 and defines a movable portion of guide 7. In the aligned position, each pocket 11 receives a share of products 3 of each group 2 during the formation of group 2, which, when completed, is inserted fully inside pocket 11 by a lifting device 41 located over branch 15 of belt 13, in front of walls 25 of guide 7. Lifting device 41 comprises two tubular guide elements 42 parallel to direction D2; and a slide 43, which, by means of a linear actuator 44, is moved along tubular elements 42 between a lowered position (FIG. 3) substantially facing front openings 28 in walls 25, and a raised position (not shown) substantially aligned with plates 38 and 39.

Device 41 also comprises a lifting plate 45 fitted to slide 43, and which, by means of a respective linear actuator 46 integral with slide 43, is movable in direction D1 between a position of interference (FIG. 3) in which plate 45 is located between plates 24 and beneath and contacting central portion 17 of the last product 3 in group 2, and an idle position (shown by the dotted line in FIG. 2) in which plate 45 is located over branch 15 of belt 13 and outside guide 7.

More specifically, plate 45 is moved from the idle to the interference position when, in use, slide 43 is set to the lowered position, so as to support a newly completed group 2; provides for inserting group 2 inside respective pocket 11 as slide 43 moves from the lowered to the raised position aligned with plates 38 and 39; and is restored to the idle position upon group 2 being fed by device 10 along path P2.

Conveying device 8 comprises a respective conveyor belt 47 narrower than the length of products 3, located between belts 30 and 31, and looped about two pulleys 48 (only one shown), which have respective horizontal axes of rotation crosswise to direction D3, and are fitted to a slide (not shown) to move parallel to themselves, as explained in detail later on, by virtue of a linear actuator 49, the output rod 50 of which is movable in direction D3 and connected to the pulley 48 shown.

Belt 47 comprises a number of pairs of peripheral elongated projections 51 extending outwards of belt 47 and defining conveying pockets 9. Projections 51 are narrower than the length of products 3, so that products 3 are housed inside pockets 9 with respective central portions 17 inside pockets 9, and with respective lateral end portions 18 projecting outwards of pockets 9; are longer than the height of groups 2, so that each pocket 9 receives and maintains a respective group 2 in the stacked position; and are shorter than the spacing J of pockets 11 along belts 30, 31, i.e. are shorter than the distance between two successive projections 40 of two different pockets 11.

Operation of unit 1 is controlled by a known central control unit (not shown), which receives signals from a known sensor (not shown) located along guide 7 to determine completion of group 2, and from at least a further known sensor (not shown) located at station 12 to determine the arrival in station 12 of groups 2.

The central control unit in turn generates output signals for controlling a motor M1 angularly integral with pulley 14 of supply device 4; two motors M2 angularly integral with screws 20 of stacking device 6; actuators 44 and 46 of lifting device 41; two motors M3 angularly integral with pulleys 33 and 35 of transfer device 10; a motor M4 angularly integral with pulley 48; and actuator 49 of conveying device 8. Motors M3 and M4 are related to one another by an electric timing axis for ensuring respective pockets 11 and 9 are not only fed at the same speed V1 along path P2, but are also fed in steps and in time with one another through station 12 to transfer groups 2 at station 12.

Operation of unit 1 will now be described with reference to groups 2 each comprising, by way of example, five products 3, and as of the instant in which guide 7 is empty; a pocket 11 is arrested by transfer device 10 in the aligned position with guide 7; and plate 45 is set to the idle position with slide 43 in the lowered position.

As of the above condition, conveyor belt 13 of supply device 4 supplies stacking station 5 with successive products 3, which, just before contacting stop portions 29 of walls 26, are engaged by the bottom ends 22 of screws 20, which, besides lifting products 3 out of pockets 16 in direction D2, cooperate with walls 25 and 26 of plates 24 to feed products 3 into guide 7 in direction D2, stack products 3 one beneath the other, and so form a group 2. More specifically, group 2 is formed both inside a fixed portion 52 of guide 7 defined by the portions of walls 25 and 26 extending above the point through which respective top ends 23 of screws 20 travel, and inside the movable portion of guide 7 defined, as stated, by a pocket 11 in the aligned position.

Once group 2 is completed, i.e. upon said sensor detecting the presence of five products 3 stacked along guide 7 at stacking station 5, lifting device 41 is activated by the central control unit to insert group 2 fully inside respective pocket 11. More specifically, actuator 46 moves plate 45 from the idle position to the interference position beneath central portion 17 of the last product 3 forming group 2, and actuator 44 moves slide 43 in direction D2 to lift group 2 in direction D2 and align plate 45 with plates 38 and 39.

At this point, group 2 is housed entirely inside respective pocket 11, with the lateral end portions 18 of products 3 secured firmly by respective pairs of projections 40 to prevent group 2 from breaking up.

Once group 2 is housed inside respective pocket 11, the central control unit activates both motors M3 and motor M4 to feed respective pockets 11 and 9 in direction D3 at the same speed V1. As pocket 11 with respective group 2 is fed forward, group 2 is moved out of stacking station 5, plate 45 is unloaded and reset to the idle position, and plates 38 and 39 are subsequently engaged by respective lateral end portions 18 of said last product 3.

As shown in FIG. 4, when pocket 11 reaches station 12 but is still upstream from pulley 48 in direction D3, a pocket 9 is located astride pulley 48, with respective elongated projections 51 diverging and extending radially outwards from pulley 48. More specifically, the first projection 51 to travel about pulley 48 (projection 51a) is located substantially in front of group 2 and ahead of respective pocket 11 in direction D3, while the second projection 51 to travel about pulley 48 (projection 51b) is located substantially beneath group 2 and behind respective pocket 11.

At this point, since pockets 9 and 11 travel at the same speed V1 in direction D3, the central control unit operates actuator 49 to move pulleys 48 of belt 47 in the opposite direction to the traveling direction D3 of pockets 9 and 11 and at a speed equal to speed V1, so as to bring projection 51a up to group 2 as projection 51a rotates about pulley 48. More specifically, as a result of pulleys 48 and belt 47 being moved simultaneously in opposite directions, the point at which projection 51a is joined to belt 47 is arrested temporarily so that projection 51a rotates about said point, and projection 51b is rotated faster about pulley 48 and so positioned directly behind group 2; in this way each pocket 9 gradually envelops the group 2 still housed inside pocket 11.

Once projections 51a and 51b of pocket 9 are positioned parallel to respective projections 40 of pocket 11, the group 2 conveyed by pocket 11 is at this point locked between projections 40 and 51, and actuator 49 gradually restores pulleys 48 to their original position at a speed which, added to a transient speed of belt 47, equals speed V1. As a further pocket 11 is about to move into the aligned position with guide 7, the central control unit arrests motors M3 and M4, and hence the travel of pockets 9 and 11, so that the group 2 locked inside both pocket 11 and pocket 9 remains in this position until a further group 2 is completed at stacking station 5. Obviously, by varying the spacing J of pockets 11 along belts 30 and 31, the sequence of the above steps may be varied so that, for example, pocket 11 may be unloaded before a further group 2 is formed, in which case, conveying device 8 may be operated continuously as opposed to in steps.

In the example shown in FIGS. 4 and 5, spacing J is such that, when group 2 is locked inside both pocket 11 and pocket 9, a further pocket 11 is aligned with guide 7. At this point, it should be stressed that, as transfer device 10 feeds group 2 along path P2, the products 3 supplied by device 4 to station 5 continue to be stacked along guide 7 to prepare a further group 2 along the fixed portion 52 of guide 7.

Upon a further group 2 being completed, the central control unit reactivates motors M3 and M4 to finally unload the previous group 2 from pocket 11 into pocket 9.

Group 2 is unloaded from respective pocket 11 into respective pocket 9 at pulleys 33 and 35 of transfer device 10. That is, as belts 30, 31 rotate about respective pulleys 33, 35, the first projections 40 (40a) to reach pulleys 33, 35 are moved away from the second projections 40 (40b) to reach pulleys 33, 35, and a relative speed is determined between pockets 11 and 9.

When moved away from each other, projections 40 diverge to open respective pocket 11 and release respective group 2, which, being by now firmly housed inside pocket 9, is withdrawn from pocket 11 by pocket 9 and fed further along path P2.

From the moment in which group 2 is stacked to the moment in which group 2 is unloaded into respective pocket 9, projections 40 and 51 therefore provide for maintaining the products 3 in group 2 firmly in the stacked position, so that unit 1 may advantageously be used for forming and conveying groups 2 of stacked products 3 in general, regardless of the shape of products 3, i.e. even substantially irregularly shaped products 3 incapable of remaining stacked on their own.

I claim:

1. A method of forming and conveying groups of elongated products, the method comprising the steps of feeding said products successively and continuously along a first path (P1) to a stacking device; stacking said products, by means of said stacking device, along guide means to form a group, said guide means maintaining the products in said group in a stacked position; and transferring said group along a second path (P2) into a respective conveying pocket moving along the second path (P2), said group being transferred by means of a retaining pocket moving in steps along said second path (P2) and through a position of alignment with said group on said stacking device, said group being transferred into said conveying pocket as the retaining pocket travels along said second path (P2); and said retaining and conveying pockets simultaneously engaging the along said second path (P2); and said retaining and conveying pockets simultaneously engaging the group as the group travels through a transfer station located along said second path (P2).

2. A method as claimed in claim 1, wherein said guide means comprise a fixed portion located along the stacking device; and a movable portion located along said second path (P2); said movable portion being defined by a said retaining pocket when the retaining pocket is in said position of alignment.

3. A method as claimed in claim 2, wherein said fixed portion of said guide means extends beyond the stacking device in a stacking direction (D2) parallel to the guide means; each group, once formed along said guide means, being engaged by lifting means to clear said fixed portion and be inserted fully inside said retaining pocket in said position of alignment.

4. A method as claimed in claim 1, wherein each group is transferred into a respective said conveying pocket by feeding the respective retaining pocket along said second path (P2); enveloping the group, housed inside the respective retaining pocket with the respective conveying pocket; feeding the retaining pocket and conveying pocket together through a transfer station located along said second path (P2); and withdrawing the group from the respective retaining pocket by means of the respective conveying pocket.

5. A method as claimed in claim 1, wherein each group is transferred into a respective said conveying pocket by feeding the respective retaining pocket along an initial portion of said second path (P2); feeding the respective conveying pocket along an end portion of said initial portion, in time with the corresponding retaining pocket, the conveying pocket being partly open to receive the respective group, and being gradually closed about the group as the conveying pocket travels along said end portion; gradually opening the retaining pocket at the end of said end portion; and imparting to the conveying pocket, along said second path (P2), a relative speed with respect to the corresponding retaining pocket to withdraw the respective group from the respective retaining pocket.

6. A unit for forming and conveying groups of elongated products, the unit comprising supply means for feeding said products successively and continuously along a first path (P1) to a stacking station; a stacking device located at the stacking station for stacking said products into a group; guide means located at the stacking station to maintain the products in said group in a stacked position; transfer means comprising at least one retaining pocket moving in steps along a second path (P2) for transferring said group along said second path (P2); and conveying means having conveying pockets moving along the second path (P2), and each for receiving a respective group; said retaining pocket moving through a position of alignment with said group on said stacking device, and through a transfer station to transfer the group to a respective conveying pocket; said transfer means comprising two first conveyor belts facing each other on either side of said second path (P2) and separated by a distance equal to the length of said products, and each first conveyor belt extending through said transfer station, and having a number of pairs of peripheral projections defining said retaining pockets together with the peripheral projections of the other first conveyor belt.

7. A unit as claimed in claim 6, wherein said guide means comprise a fixed portion located along the stacking device; and a movable portion located along said second path (P2); said movable portion being defined by a said retaining pocket when the retaining pocket, in use, is in said position of alignment.

8. A unit as claimed in claim 7, wherein said fixed portion of said guide means extends beyond the stacking device in a stacking direction (D2) parallel to the guide means; the unit comprising lifting means for engaging each group located along said guide means, and for inserting the group fully inside said retaining pocket in said position of alignment, to clear said fixed portion.

9. A unit as claimed in claim 7, wherein said conveying means comprise a second conveyor belt extending along said second path (P2) and, at least along said transfer station, in an intermediate position between said first conveyor belts; said second conveyor belt having a number of pairs of peripheral elongated projections defining said conveying pockets.

10. A unit as claimed in claim 9, wherein said transfer means and said conveying means comprise respective drive means for feeding the respective retaining pockets and conveying pockets in time with each other through said transfer station.

11. A unit as claimed in claim 10, wherein said conveying means comprise actuating means cooperating with said drive means to move said conveying pockets between an open position, in which the respective elongated projections diverge and partly enclose a respective retaining pocket, and a closed position, in which the respective elongated projections are parallel to each other and to the projections of the respective retaining pocket, and engage a group housed inside the retaining pocket.

12. A unit as claimed in claim 6, wherein said stacking device is a screw stacking device.

13. A unit as claimed in claim 12, wherein said stacking device comprises a pair of screws located on either side of said first path (P1); and respective drive means for rotating the screws continuously about respective axes of rotation to stack said products.

14. A unit for forming and conveying groups of elongated products, the unit comprising supply means for feeding said products successively and continuously along a first path (P1) to a stacking station; a stacking device located at the stacking station for stacking said products into a group; guide means located at the stacking station to maintain the products in said group in a stacked position; transfer means comprising at least one retaining pocket moving in steps along a second path (P2) for transferring said group along said second path (P2); and conveying means having conveying pockets moving along the second path (P2), and each for receiving a respective group; said retaining pocket being mounted for movement through a position of alignment with said group on said stacking device, and through a transfer station to transfer the group to a respective conveying pocket as both the respective conveying pocket and said retaining pocket travel along said second path (P2); and drive means being provided to advance said retaining and conveying pockets through said transfer station to simultaneously engage the respective group as the group travels through said transfer station.

15. A unit as claimed in claim 14, wherein said transfer means comprise two first conveyor belts facing each other on either side of the second path (P2) and separated by a distance equal to a length of said products; each first conveyor belt extending through said transfer station, and having a number of pairs of peripheral projections defining said retaining pockets together with the peripheral projections of the other first conveyor belt.

16. A unit as claimed in claim 15, wherein said conveying means comprise a second conveyor belt extending along said second path (P2) and, at least along said transfer station, in an intermediate position between said first conveyor belts; said second conveyor belt having a number of pairs of peripheral elongated projections defining said conveying pockets.

\* \* \* \* \*